Jan. 14, 1936.  S. K. HOFFMAN ET AL  2,027,592
DRIVING MECHANISM FOR PROPELLERS
Filed Oct. 29, 1934  2 Sheets-Sheet 2
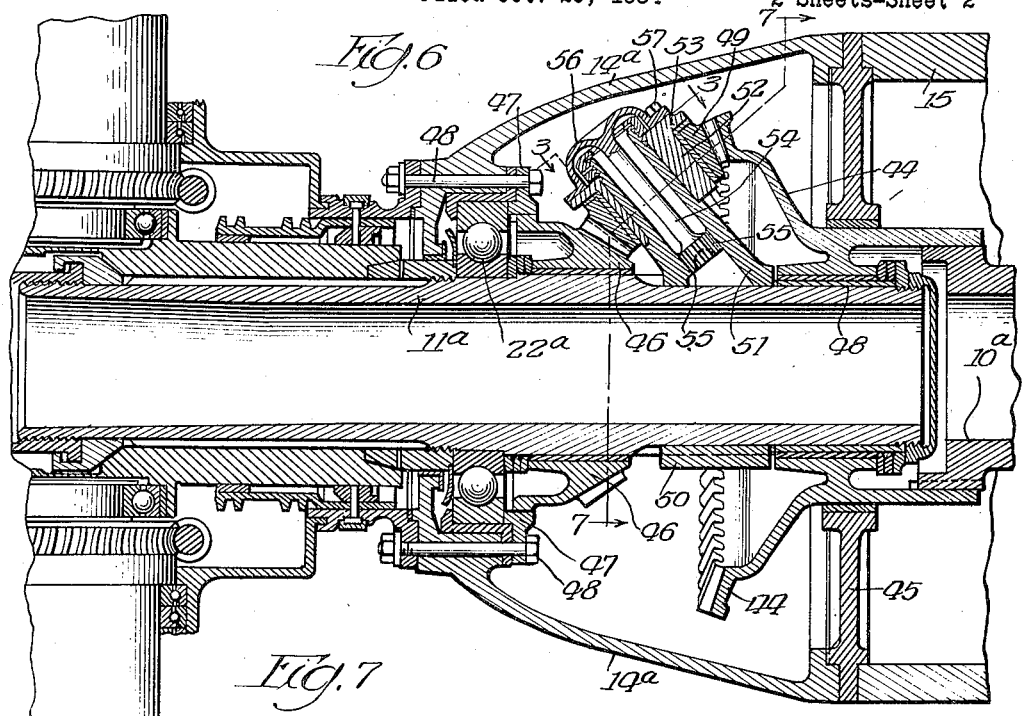
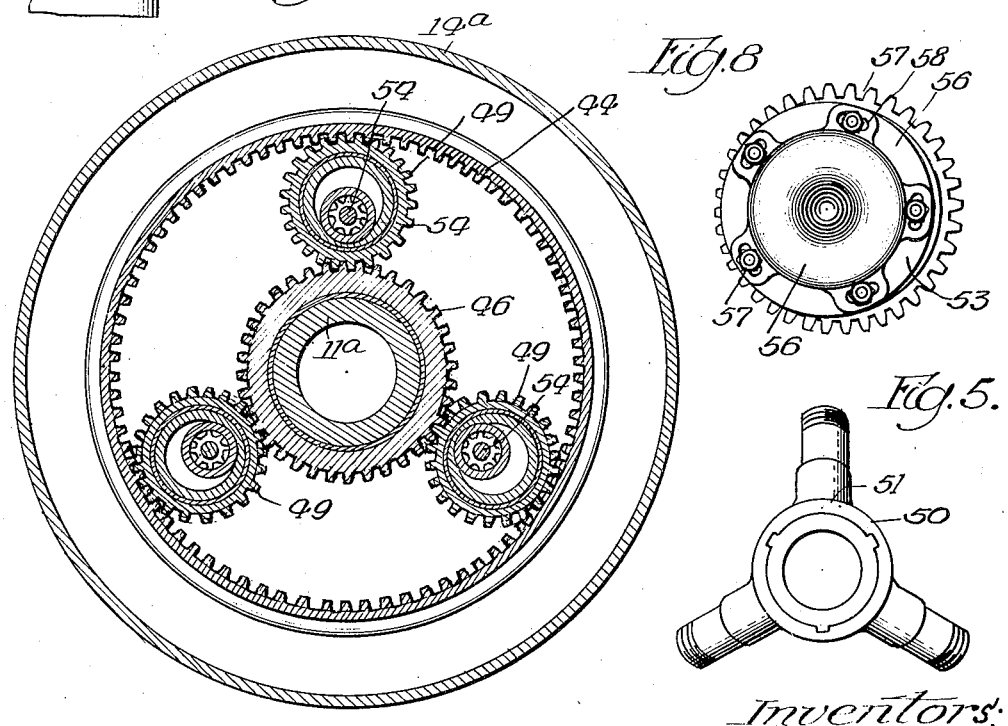
Inventors:
Samuel K. Hoffman &
Clarence H. Wiegman
By Fred Gerlach Atty Patented Jan. 14, 1936

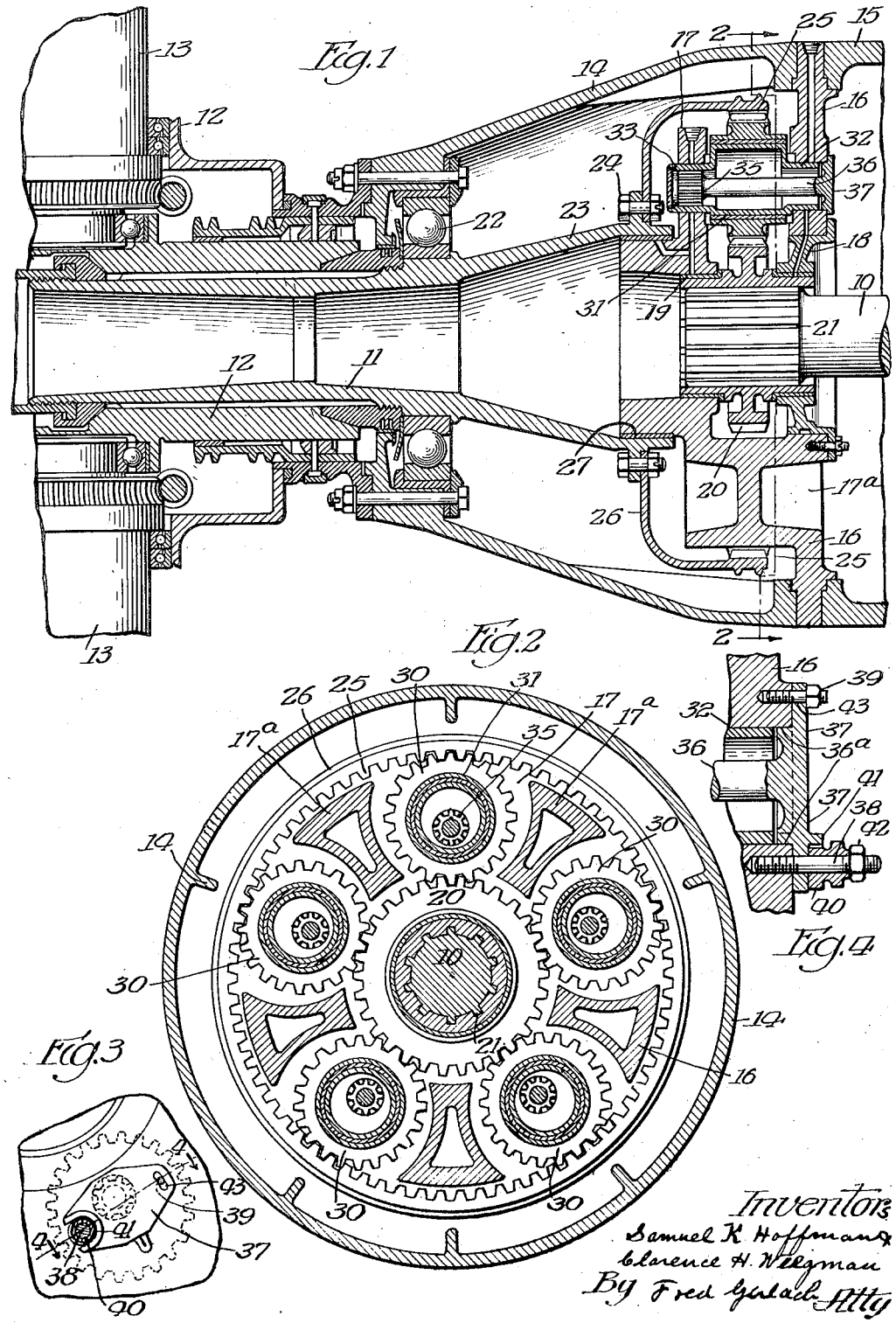

2,027,592

UNITED STATES PATENT OFFICE 2,027,592

DRIVING MECHANISM FOR PROPELLERS

Samuel K. Hoffman and Clarence H. Wiegman, Williamsport, Pa., assignors to Lycoming Manufacturing Company, Williamsport, Pa., a corporation of Pennsylvania Application October 29, 1934, Serial No. 750,500

15 Claims. (Cl. 74—413)

The invention relates to transmission gearing and more particularly to the type adapted for use in driving aircraft propellers from the engine.

In driving aircraft propellers by means of internal combustion engines, it has been found desirable to use reduction gearing between the engine and the propeller because the propeller efficiency is a function of the ratio of forward speed to rotational speed and, in most instances, the efficiency is a maximum at some rotational speed less than the speeds generally used for internal combustion engines. When the optimum propeller speed is established, a reduction gear removes the limits on maximum engine speed and permits it to be designed for, and operated at, high speeds with a resulting reduction in weight and this is desirable in aircraft. The necessity in aircraft for light power plant weight requires that the reduction gearing shall be light and compact and normally operable at high values of working stresses. Since the loads imposed upon the teeth of the reduction gearing are vibratory in character, which results from variation in the torque impulses caused by the explosions in the individual engine cylinders and torsional vibrations in the crank-shaft, it is very desirable to protect the gearing from additional loads due to mechanical imperfections which might cause failure in operation. The desired compactness can be achieved by employing a plurality or series of intermediate gears and dividing, or equally distributing, the torque between the intermediate gears, which engage teeth of the driving and driven gears.

One object of the invention is to provide improved speed reducing mechanism in which the load upon the intermediate gears is substantially equalized or distributed to prevent an excessive individual loading of any of the intermediate gears which are designed to assume only a proportionate share of the entire load. By so distributing the load, the failure of the gearing in high speed operation will be avoided.

Another object of the invention is to provide simple and efficient reduction gearing adapted for driving aircraft propellers from an engine.

Other objects of the invention will appear from the description of the details.

The invention consists in the several novel features which are hereinafter set forth and are more particularly defined by claims at the conclusion hereof.

In the drawings:

Fig. 1 is a longitudinal section of mechanism embodying one form of the invention.

Fig. 2 is a section on line 2—2 of Fig. 1.

Fig. 3 is an end view illustrating the manner of securing to the gear case one end of the shaft for resiliently positioning the intermediate gears.

Fig. 4 is a section on line 4—4 of Fig. 3.

Fig. 5 is a detail of the spider or frame on which the intermediate pinions are mounted and through which the propeller shaft is driven.

Fig. 6 is a longitudinal section illustrating another form of the invention.

Fig. 7 is a longitudinal section taken on line 7—7 of Fig. 6.

Fig. 8 is an end view of one of the intermediate beveled pinions shown in Fig. 6.

In Figs. 1 to 4 the invention is exemplified in mechanism comprising a shaft 10, which may be the crankshaft of the engine or an extension thereof, and constitutes the drive shaft for the transmission; a propeller shaft 11 co-axial with the shaft 10 and to which is secured the hub 12 in which the propeller blades 13 are mounted in any suitable manner, as well understood in the art; and a housing or case 14 which is supported from an extension 15 of the engine-casing encloses the reduction gearing and also serves as a support for the propeller. The shaft 11 constitutes the shaft which is driven at a reduced speed from the shaft 10.

A gear-supporting cage or frame comprises a wall or head 16, which has its marginal portion removably secured between the casing 15 and the housing 14 by suitable bolts, an integral wall 17, and connecting members 17ª. The walls 16 and 17 are spaced apart to form an intermediate space for the driving gear on the shaft 10 and the intermediate gears driven thereby. A toothed driving pinion or gear 20 extends between walls 16 and 17 and has a rearwardly extending hub portion journaled in a bearing 18, which is removably secured in wall 16, and a forwardly extending hub portion journaled at 19 in the wall 17. Shaft 10 is splined at 21 to pinion 20 so they will rotate together. The driven or propeller shaft 11 is journaled in a ball-bearing 22 which is mounted in the front portion of housing 14 and has an enlarged rear portion 23 which is journaled on a bearing 27 on the front wall 17. Shaft 11 is hollow and has a flange to which is secured, by bolts 24, a bell-shaped gear 26 with internal teeth 25, which are aligned with the teeth of driving pinion 20.

A series of intermediate gears 30 are provided to drive the gear 26 and shaft 11 from pinion 20 at a reduced speed. Each intermediate gear has external teeth, which mesh with the external teeth of the driving pinion 20 and the internal teeth 25 of the gear 26 on the driven shaft 11. These intermediate gears are equidistantly spaced circumferentially around the shaft 10 and may be of any suitable number. Each intermediate gear 30 is journaled on the outer periphery of a bearing 31 which is eccentrically journaled in the walls 16, 17. Each bearing 31 has hollow rear and front co-axial trunnions 32, 33. Each trunnion 32 is journaled in a bearing in the wall 16, and each trunnion 33 is journaled in a bearing in the wall 17. These trunnions are located in off-center relation with respect to the center of the bearings 31 to permit the latter to swing circumferentially or to be angularly deflected around the trunnion axis. The trunnion 33 of each bearing 31 is provided with interfitting splines interfitting with splines 35 on a torsional resilient shaft 36, which extends rearwardly through the hollow co-axial trunnion 32, and is provided with a cylindrical portion 36ᵃ which is seated in the trunnion bearing in wall 16 and provided at the back of said wall with an integral flange or plate 37 which is secured against rotation in wall 16. Each shaft 36 is sufficiently resilient to permit the eccentric bearing to which it is splined to be angularly deflected on the axis of the trunnion and to permit corresponding variation of the circumferential positioning of the gear 30 for the purpose hereinafter set forth. Each plate 37 is adjustably and fixedly held on the wall 16 by means of bolts 38 and 39 to hold the eccentric bearing 31 in a predetermined, normal, circumferential position and to correspondingly position the gear 30 journaled thereon. An eccentric sleeve 40 is rotatable around the bolt 38 to engage a rib 41 on plate 37, so that by rotation of said sleeve the resilient shaft 36 integral with plate 37, will be rotated in its bearing in wall 16 to accurately and normally set the eccentric bearing 31 in the correct position for equalizing the tooth load on the gears 30. A slot 43 is formed in the opposite side of plate 37 to permit this rotative adjustment of shaft 36. Lock nuts 42 serve to clamp the sleeve 40 and plate 37 to wall 16. By means of this adjustment, each resilient shaft 36 may be adjusted to subject the shaft to the desired degree of torsional strain to properly position the eccentric bearing and intermediate gear on said bearing.

In operation, the driven shaft 10 will drive pinion 20 which will rotate intermediate gears 30 around their respective eccentrics 31 and cause the teeth of the intermediate gears to drive the gear 26 and propeller shaft 11 at a reduced speed.

In operation, the series of intermediate gears 30 introduced between the driving gear 20 and the driven gear 26 are rotatable around the bearings 31, which are eccentrically journaled in the walls 16, 17. The load on the driving tooth of gear 20 has an equal reaction from the driven tooth of gear 26. The bearing 31 being rotatable around its eccentric axis at the center of the trunnions, the position of the center of the bearing and the pinion 30 carried thereby is determined by equilibrium between the tooth loads and the pinion is movable by a circumferential moment applied to the eccentric bearing which results from variation of the tooth loads on the gear 30. This moment is resisted by the torsional strain on the resilient shaft 36, one end of which is locked and the other end of which is splined to a trunnion of the eccentric bearing. When the eccentric is moved circumferentially against the resilient torsion of shaft 36, the axis of the gear 30 will move circumferentially with the eccentric which rotates around the axis of the trunnions in either direction, depending upon the direction of the relative variation in the opposite tooth loads on the pinion 30. When, for any reason, such as an imperfect tooth profile or the introduction of foreign matter between the teeth, or any other cause, either of the tooth loads on any of the gears 31 is momentarily increased, the increment will move the eccentric 31 circumferentially on the axis of the trunnion. The position of the eccentric and pinion will be determined by equilibrium between the tooth loads and the resilient shaft 36 will permit this circumferential movement of the gear and eccentric. Thus, any momentary increase in tooth load causes an angular deflection of the eccentrically mounted bearing in one direction on the trunnion axis and this carries the line of engagement of the engaging teeth on the gear 30 and gears 20, 26 circumferentially away from the normal line. The increment in load thereon will then be relieved. This increment in tooth load tends to move the intermediate gear to which it is applied in the direction of the increment in load and thereby relieves the pinion affected and distributes the change in load among all the other intermediate gears. In consequence, when, in operation, an increase or a decrease in load is placed on the engaging teeth of one of the intermediate gears, the gear 30 will be relieved of the increment, and the entire load will be equalized between all of the intermediate gears. The eccentric will move the gear from its normal position an amount determined by the increment of the tooth loads and the degree of torsional resiliency of the shaft 36.

In assembling the gearing, the driven shaft may be temporarily locked against rotation while equal moments are impressed upon the plates 37 on the flexible shafts 36 to position the eccentrics so the intermediate gears 30 will be equally loaded prior to being clamped in position by means of nuts 39 and 42.

In the modified form of the invention illustrated in Figs. 6 to 9, the engine shaft 10ᵃ is splined to a beveled gear 44 which is journaled in a head 45 which is fixed between said casing and a gear housing 14ᵃ. A stationary beveled pinion 46 is splined to a ring 47 which is secured by bolts 48 in the housing 14ᵃ. The propeller shaft 11ᵃ is co-axial with shaft 10ᵃ and journaled in a ball-bearing 22ᵃ mounted in the housing 14ᵃ and in a bearing 48 in the hub of gear 44. A series of beveled intermediate planetary gears 49 have their teeth engaging the teeth on pinion 46 and the teeth on gear 44. These pinions are carried by a spider or frame comprising a hub 50 and integral hollow trunnions 51. Said spider or frame is keyed to drive the propeller shaft 11ᵃ which rotates therewith. Each intermediate gear 49 is journaled on a bearing 52 which is eccentrically journaled on one of the hollow trunnions 51. Each eccentric 52 is provided at its outer end with an integral flange 53. A torsionally resilient shaft 54 in the trunnion 51 has its inner end splined at 55 to said trunnion and at its outer end has an integral flange or cover 56 which is secured by bolts 57 to the flange 53 on the eccentric 52.

Arcuate slots 58 are formed in the flange 56 to permit the eccentric to be rotatably adjusted relatively to the resilient shaft 54.

In this form of the invention the gear 44 is driven by the engine shaft to drive the intermediate gears 53 in a planetary path around fixed gear 46 and the planetary movement rotates the spider 50, 51, which is fixed to the propeller shaft 11ª so that the latter shaft will be driven at a reduced speed. The eccentrics 52 and resilient shafts 54 permit each of the gears 49, upon an increase in the tooth load, to cause an angular deflection of the eccentric for the gear which receives the increment, to move the gear circumferentially in the direction of increment in the load and thereby relieve it and distribute the load among all the other intermediate gears in a manner similar to that described in connection with the other form of the invention.

The invention exemplifies speed reducing transmission gearing adapted for driving aircraft propellers, in which a plurality or series of intermediate gears is used between the driving and a driven shaft, and in which provision is made for equalizing or distributing the tooth loads upon the intermediate gears, and thereby avoiding excessive loading of any of the intermediate gears.

The invention is not to be understood as restricted to the details set forth since these may be modified within the scope of the appended claims without departing from the spirit and scope of the invention.

Having thus described the invention, what we claim as new and desire to secure by Letters Patent is:

1. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable eccentrically mounted bearings on which the intermediate gears are respectively journaled, and means for resiliently, independently and rotatably positioning the bearings to permit angular deflection of the intermediate gears responsively to variations in the tooth loads thereon, for equalizing the tooth loads on the intermediate gears.

2. In transmission gearing, the combination of a drive shaft, a driven shaft, and mechanism for driving the driven shaft from the drive shaft comprising an internally and an externally toothed gear, a plurality of intermediate toothed gears, each having teeth meshing with said internally and externally toothed gears, independently rotatable eccentrically mounted bearings on which the intermediate gears are respectively journaled, and means for resiliently, independently and rotatably positioning the bearings to permit angular deflection of the intermediate gears responsively to variations in the tooth loads thereon for equalizing the tooth loads on the intermediate gears.

3. In transmission gearing, the combination of a drive shaft, a driven shaft, and mechanism for driving the driven shaft from the drive shaft comprising a pinion on the drive shaft, an internally toothed gear on the driven shaft, a plurality of intermediate toothed gears, each having teeth meshing with the pinion and the internally toothed gear, independently rotatable eccentrically mounted bearings on which the intermediate gears are respectively journaled, and means for resiliently, independently and rotatably positioning the bearings to permit angular deflection of the intermediate gears responsively to variations in the tooth loads thereon for equalizing the tooth loads on the intermediate gears.

4. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable eccentrically mounted bearings, on which the intermediate gears are respectively journaled, and adjustable means for resiliently, independently and rotatably positioning the bearings to permit angular deflection of the intermediate gears responsively to variations in the tooth loads thereon for equalizing the tooth loads on the intermediate gears.

5. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable eccentrically mounted bearings on which the intermediate gears are respectively journaled, and torsionally resilient means for independently and rotatively positioning the bearings to permit individual angular deflection of the intermediate gears responsively to variation in the tooth loads thereon, for equalizing the tooth loads on the intermediate gears.

6. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable eccentrically mounted bearings on which the intermediate gears are respectively journaled, and adjustable torsionally resilient shafts for rotatably positioning the bearings to permit individual angular deflection of the intermediate gears responsively to variation in the tooth loads thereon, for equalizing the tooth loads on the intermediate gears.

7. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable eccentrically mounted bearings on which the intermediate gears are respectively journaled, and torsionally resilient shafts for positioning the bearings to permit individual angular deflection of the intermediate gears responsively to variation in the tooth loads thereon for equalizing the tooth loads on the intermediate gears.

8. In transmission gearing, the combination of a drive shaft, a driven shaft, and mechanism for driving the driven shaft from the drive shaft comprising a pair of toothed gears, a plurality of intermediate toothed gears, each having teeth meshing with the teeth of both of said pair of gears, independently rotatable bearings on which the intermediate gears are respectively journaled, trunnions for eccentrically supporting said bearings and torsionally resilient shafts in said trunnions for relatively positioning the bearings to permit individual angular deflection of the intermediate gears responsively to variation in the tooth loads thereon for equalizing the tooth loads on the intermediate gears.

9. In transmission gearing, the combination of a drive shaft, a co-axial driven shaft, and mechanism for driving the driven shaft from the drive shaft comprising an externally toothed gear, an internally toothed gear, a plurality of intermediate gears having teeth meshing with the internal and external gears, independently rotatable eccentrically mounted bearings on which the intermediate gears are mounted, and resilient means for independently and rotatively positioning the bearings to permit individual angular deflection of the intermediate gears so as to distribute the tooth load to all of the intermediate gears.

10. In transmission gearing, the combination of a drive shaft, a co-axial driven shaft, and mechanism for driving the driven shaft from the drive shaft comprising an externally toothed gear, an internally toothed gear, a plurality of intermediate gears having teeth meshing with the internal and external gears on which the intermediate gears are mounted independently rotatable, eccentrically mounted bearings, on which the intermediate gears are mounted, a stationary support, trunnions eccentrically located on said bearings, journalled in said support, and resilient means for independently and rotatively positioning the bearings to permit individual angular deflection of the intermediate gears so as to distribute the tooth load to all of the intermediate gears.

11. In transmission gearing, the combination of a drive shaft, a co-axial driven shaft, and mechanism for driving the driven shaft from the drive shaft comprising an externally toothed gear, an internally toothed gear, and a plurality of intermediate gears having teeth meshing with the internal and external gears, independently rotatable bearings on which the intermediate gears are mounted, a stationary support, trunnions eccentrically located on said bearings and journalled in said support, and resilient shafts in said trunnions for independently positioning the bearings to permit individual angular deflection of the intermediate gears so as to distribute the tooth load to all of the intermediate gears.

12. In transmission gearing, the combination of a drive shaft, a co-axial driven shaft, and mechanism for driving the driven shaft from the drive shaft comprising an externally toothed gear, an internally toothed gear, and a plurality of planetary intermediate gears having teeth meshing with the internal and external gears, independently rotatable eccentrically mounted bearings on which the intermediate planetary gears are journaled, and resilient means for independently and rotatively positioning the bearings to permit individual angular deflection of the intermediate gears, so as to distribute the tooth load to all of the intermediate gears.

13. In transmission gearing, the combination of a drive shaft, a coaxial driven shaft, mechanism for driving the driven shaft from the drive shaft, comprising an externally toothed gear, an internally toothed gear, and a plurality of intermediate gears having teeth meshing with the internal and external gears, independently rotatable eccentrically mounted hollow bearings on which the intermediate gears are respectively journaled and torsionally resilient shafts for rotatably positioning the bearings to permit angular deflection of the intermediate gears so as to distribute the tooth-load to all of the intermediate gears, each shaft extending into one of the hollow bearings and having one of its ends secured against rotation with the bearing and its other end splined to the bearing.

14. In transmission gearing, the combination of a drive shaft, a coaxial driven shaft, mechanism for driving the driven shaft from the drive shaft, comprising an externally toothed gear, an internally toothed gear, and a plurality of intermediate gears having teeth meshing with the internal and external gears, independently rotatable eccentrically mounted hollow bearings on which the intermediate gears are respectively journaled and torsionally resilient shafts for rotatably positioning the bearings to permit angular deflection of the intermediate gears so as to distribute the tooth-load to all of the intermediate gears, each shaft extending into one of the hollow bearings and having one of its ends adjustably secured against rotation with the bearing and its other end splined to the bearing.

15. In transmission gearing, the combination of a driven shaft, a coaxial driven shaft, mechanism for driving the driven shaft from the drive shaft, comprising an externally toothed gear, an internally toothed gear, and a plurality of intermediate gears having teeth meshing with the internal and external gears, independently rotatable hollow bearings on which the intermediate gears are respectively journaled, provided with hollow eccentric trunnions, and torsionally resilient shafts for rotatably positioning the bearings to permit angular deflection of the intermediate gears so as to distribute the tooth-load to all of the intermediate gears, each of said shafts extending transversely through one of the bearings and into the hollow trunnions and having one of its ends secured against rotation with the bearing and its other end splined to one of the trunnions.

SAMUEL K. HOFFMAN.
CLARENCE H. WIEGMAN.